United States Patent
Tong et al.

(10) Patent No.: US 10,509,397 B2
(45) Date of Patent: Dec. 17, 2019

(54) ACTION INFORMATION LEARNING DEVICE, ACTION INFORMATION OPTIMIZATION SYSTEM AND COMPUTER READABLE MEDIUM

(71) Applicant: FANUC CORPORATION, Yamanashi (JP)

(72) Inventors: Zheng Tong, Yamanashi (JP); Takuma Nishimura, Yamanashi (JP); Yuuzou Inaguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 20 days.

(21) Appl. No.: 15/857,911

(22) Filed: Dec. 29, 2017

(65) Prior Publication Data

US 2018/0210431 A1 Jul. 26, 2018

(30) Foreign Application Priority Data

Jan. 26, 2017 (JP) ................................. 2017-011910

(51) Int. Cl.
*G05B 19/418* (2006.01)
*G05B 13/02* (2006.01)
*G05B 19/404* (2006.01)

(52) U.S. Cl.
CPC ..... *G05B 19/41835* (2013.01); *G05B 13/027* (2013.01); *G05B 19/404* (2013.01);
(Continued)

(58) Field of Classification Search
CPC ........... G05B 2219/33038; G06N 5/02; G05D 23/1904
See application file for complete search history.

(56) References Cited

U.S. PATENT DOCUMENTS 6,291,959 B1 9/2001 Yoshida et al.
8,729,420 B2 * 5/2014 Kudou ................... B23H 1/024
219/69.13
(Continued)

FOREIGN PATENT DOCUMENTS

DE 10 2010 030 691 A1 1/2012
DE 10 2016 010 064 A1 4/2017
(Continued)

OTHER PUBLICATIONS

An Office Action mailed by the Japanese Patent Office dated Jul. 3, 2018, which corresponds to Japanese Patent Application No. 2017-011910 and is related to U.S. Appl. No. 15/857,911.
(Continued)

*Primary Examiner* — Robert E Fennema
*Assistant Examiner* — Santosh R Poudel
(74) *Attorney, Agent, or Firm* — Studebaker & Brackett PC

(57) ABSTRACT

To perform reinforcement learning that enables selecting action information for shortening a cycle time while also avoiding the occurrence of overheating. An action information learning device (300) includes: a state information acquisition means (310) for acquiring state information including an operation pattern of a spindle and a combination of parameters related to machining of a machine tool (100); an action information output means (320) for outputting action information including adjustment information for the operation pattern and the combination of parameters included in the state information; a reward calculation means (333) for acquiring judgment information which is information for temperature of the machine tool (100) and a machining time related to the machining of the machine tool (100), and calculating a value of a reward for reinforcement learning based on the judgment information thus acquired;
(Continued)

and a value function update means (332) for updating a value function by performing the reinforcement learning based on the value of the reward, the state information and the action information.

6 Claims, 4 Drawing Sheets

(52) U.S. Cl.
CPC . *G05B 19/41855* (2013.01); *G05B 19/41875* (2013.01); *G05B 2219/33038* (2013.01)

(56) References Cited

U.S. PATENT DOCUMENTS

| | | | | |
|---|---|---|---|---|
| 9,008,840 B1* | 4/2015 | Ponulak | ............... | B25J 9/163 700/250 |
| 2005/0160847 A1* | 7/2005 | Walter | ............... | B23Q 5/04 74/89.37 |
| 2006/0195409 A1* | 8/2006 | Sabe | ............... | G05B 13/0265 706/16 |
| 2012/0123583 A1* | 5/2012 | Hazen | ............... | G05B 15/02 700/110 |
| 2012/0253514 A1* | 10/2012 | Sugimoto | ............... | G05B 13/0265 700/250 |
| 2013/0173026 A1* | 7/2013 | Kawana | ............... | G05B 19/416 700/30 |
| 2013/0178952 A1* | 7/2013 | Wersborg | ............... | B23K 1/0056 700/47 |
| 2013/0223724 A1* | 8/2013 | Wersborg | ............... | B23K 1/0056 382/152 |
| 2016/0223218 A1* | 8/2016 | Barrett | ............... | F24F 11/30 |
| 2017/0060104 A1* | 3/2017 | Genma | ............... | G05B 13/0265 |
| 2017/0090429 A1* | 3/2017 | Bassily | ............... | G05B 13/027 |

FOREIGN PATENT DOCUMENTS

| | | | | |
|---|---|---|---|---|
| JP | H09-091025 A | 4/1997 | | |
| JP | 2000-271836 A | 10/2000 | | |
| JP | 2003-005836 A | 1/2003 | | |
| JP | 2006-309519 A | 11/2006 | | |
| JP | 2015-103168 A | 6/2015 | | |
| JP | 6063013 B1 * | 1/2017 | ......... | G05B 13/0265 |
| JP | 6063013 B1 | 1/2017 | | |
| WO | 2015/024809 A1 | 2/2015 | | |

OTHER PUBLICATIONS

An Office Action mailed by the State Intellectual Property Office of the People's Republic of China dated Feb. 27, 2019, which corresponds to Chinese Patent Application No. 201810069763.X and is related to U.S. Appl. No. 15/857,911.

An Office Action mailed by the German Patent and Trademark Office on Oct. 1, 2019, which corresponds to German Patent Application No. 10 2018 200 794.2 is related to U.S. Appl. No. 15/857,911; with partial English language translation.

* cited by examiner

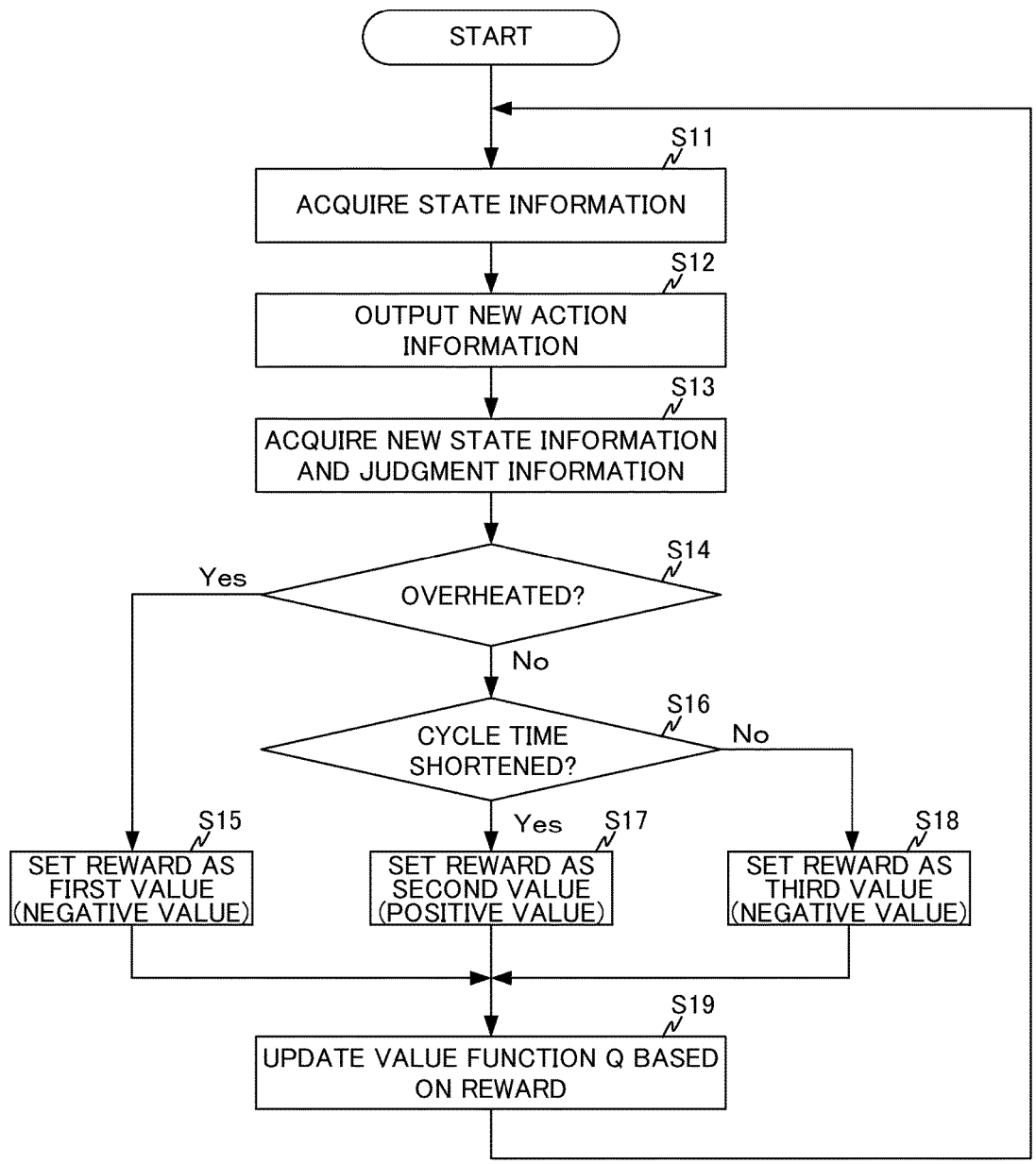

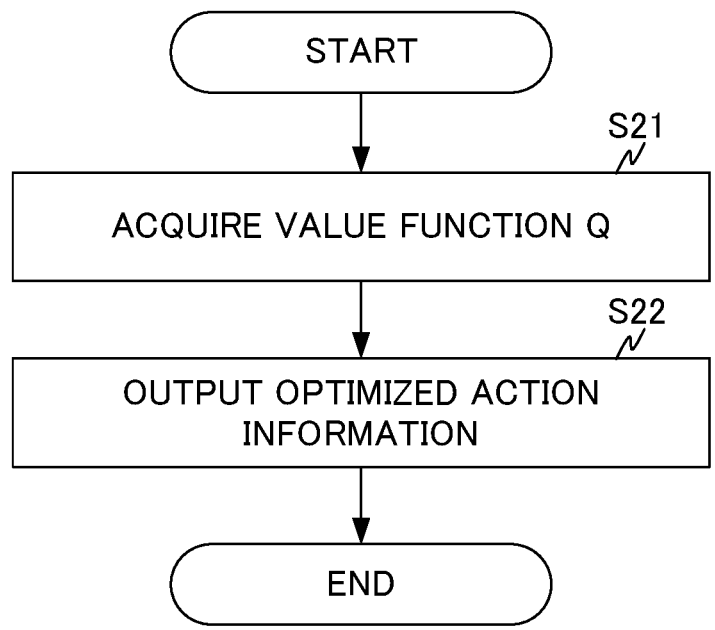

US 10,509,397 B2

ACTION INFORMATION LEARNING DEVICE, ACTION INFORMATION OPTIMIZATION SYSTEM AND COMPUTER READABLE MEDIUM

This application is based on and claims the benefit of priority from Japanese Patent Application No. 2017-011910, filed on 26 Jan. 2017, the content of which is incorporated herein by reference.

BACKGROUND OF THE INVENTION

Field of the Invention

The present invention relates to an action information learning device and computer readable medium that perform learning on action information for controlling a machine tool, etc., as well as an action information optimization system for optimizing action information.

Related Art

In order to improve the productivity from machine tools, it is necessary to reduce the cycle time, which is the machining time for machining a work. As a method for a reduction in cycle time, for example, it has been considered raise the cutting feedrate of the machine tool, and lowering the time constant of acceleration/deceleration of the spindle or feed shaft equipped to the machine tool.

However, when raising the cutting feedrate, or lowering the time constant of acceleration/deceleration of the spindle or feed shaft, the load on the drive device of each shaft consisting of a motor and amplifier increases. As a result thereof, the drive device may generate heat and overheat, and cause damage to the drive device and/or a malfunction.

In order to prevent such situations, the general technology configures to announce an alarm and stop operation of the drive unit if the temperature of the drive device rises due to heat generation up to immediately before overheating. It is thereby possible to prevent the drive device from being damaged or the like by the drive device overheating. However, a problem arises in that machining is interrupted due to not being able to restart while temporarily stopping the running of the drive device until the drive device is cooled and the temperature drops.

Considering this problem, the technology disclosed in Patent Document 1 causes the operating speed of the drive unit to decline without causing the drive unit to immediately stop, in the case of the temperature of the drive device rising up to a predetermined temperature due to heat generation. If configuring in this way, it is possible to run the drive unit and continue machining, while preventing a further rise in the temperature of the drive device.

Patent Document 1:
Japanese Unexamined Patent Application, Publication No. 2003-5836

SUMMARY OF THE INVENTION

As mentioned above, by using the technology disclosed in Patent Document 1, even in the case of there being a possibility of the drive device overheating during a machining process according to a set machining program, it is possible to continue machining by adjusting this machining program.

However, with the technology disclosed in Patent Document 1, in the case of there being a possibility of the drive device overheating during a machining process according to the set machining program, the cycle time for machining a workpiece becomes longer due to dropping the operating speed of the drive unit. In other words, with the technology disclosed in Patent Document 1, there is a problem in that the productivity from the machine tool declines.

Therefore, the present invention has an object of providing an action information learning device and action information learning program for performing reinforcement learning, on state information including combinations of operation patterns of the spindle, parameters, etc. related to a machining process set in advance for the machine tool (for example, information including a machining program, parameters, etc. described later), that enables selecting action information including adjustment information of this state information such that this machining cycle time becomes the shortest, while also avoiding the occurrence of overheating (for example, information including adjustment of this machining program and adjustment of parameters during execution of this machining program described later); as well as an action information optimization system for selecting such action information.

An action information learning device (for example, the action information learning device 300 described later) according to a first aspect of the present invention includes: a state information acquisition means (e.g. the state information acquisition unit 310 described later) for acquiring state information including an operation pattern of a spindle and a combination of parameters (e.g., the machining program and combination of parameters described later) related to machining of a machine tool (e.g., the machine tool 100 described later); an action information output means (e.g., the action information output unit 320 described later) for outputting action information including adjustment information for the operation pattern and the combination of parameters included in the state information; a reward calculation means (e.g., the reward calculation section 333 described later) for acquiring judgment information which is information for temperature of the machine tool and a machining time related to the machining of the machine tool, and calculating a value of a reward for reinforcement learning based on the judgment information thus acquired; and a value function update means (e.g., the value function update section 332 described later) for updating a value function by performing the reinforcement learning based on the value of the reward, the state information and the action information.

According to a second aspect of the present invention, the action information learning device as described in the first aspect may be configured so that the state information includes an operation pattern for either one or both of a cutting feedrate and a dwell causing the spindle standby for a designated time, as the operation pattern of the spindle, and the adjustment information includes information for performing adjustment for the operation pattern included by the state information.

According to a third aspect of the present invention, the action information learning device as described in the first or second aspect may be configured so that the state information includes parameters for either one or both of a time constant of acceleration/deceleration and a cutting feedrate override as the parameters, and the adjustment information includes information for performing adjustment for the parameters included by the state information.

According to a fourth aspect of the present invention, the action information learning device as described in any one of the first to third aspects may be configured so that the reward calculation means: sets the value of the reward as a negative value in a case of the temperature of the machine tool being at least a predetermined temperature, sets the value of the reward as a positive value in a case of the temperature of the machine tool being less than a predetermined temperature, and a machining time of the machine tool being shorter than a prior machining time, and sets the value of the reward as a negative value in a case of the temperature of the machine tool being less than a predetermined temperature, and a machining time of the machine tool being longer than a prior machining time.

According to a fifth aspect of the present invention, the action information learning device as described in any one of the first to fourth aspects may be configured so that the value function is shared with another action information learning device, and the value function update means updates the value function that was shared.

An action information optimization system (e.g., the action information optimization system 1 described later) according to a sixth aspect of the present invention includes: the action information learning device as described in any one of the first to fifth aspects; and an action information optimization device (e.g., the action information optimization device 400 described later), in which the action information optimization device generates optimized action information which is action information for maximizing a quality of the machining by the machine tool, based on a value function updated by the value function update means, and outputs the optimized action information thus generated in order to cause the machining to be performed in the machine tool.

An action information learning program according to a seventh aspect of the present invention causes a computer to function as an action information learning device, the action information learning device comprising: a state information acquisition means for acquiring state information including an operation pattern of a spindle and a combination of parameters related to machining of a machine tool; an action information output means for outputting action information including adjustment information for the operation pattern and the combination of parameters included in the state information; a reward calculation means for acquiring judgment information which is information for temperature of the machine tool and a machining time related to the machining of the machine tool, and calculating a value of a reward for reinforcement learning based on the judgment information thus acquired; and a value function update means for updating a value function by performing the reinforcement learning based on the value of the reward, the state information and the action information.

According to the present invention, it is possible to perform reinforcement learning that enables selecting action information including adjustment information of state information including an operation pattern of a spindle, combination of parameters, etc. related to a machining process set in advance for a machine tool, in order to shorten a cycle time while also avoiding the occurrence of overheating. In addition, according to the present invention, it is possible to select such action information.

BRIEF DESCRIPTION OF THE DRAWINGS

FIG. 3 is a flowchart showing basic operations during reinforcement learning in the embodiment of the present invention; and FIG. 4 is a flowchart showing basic operations during selection of optimized action information in the embodiment of the present invention.

DETAILED DESCRIPTION OF THE INVENTION

Figure 1:
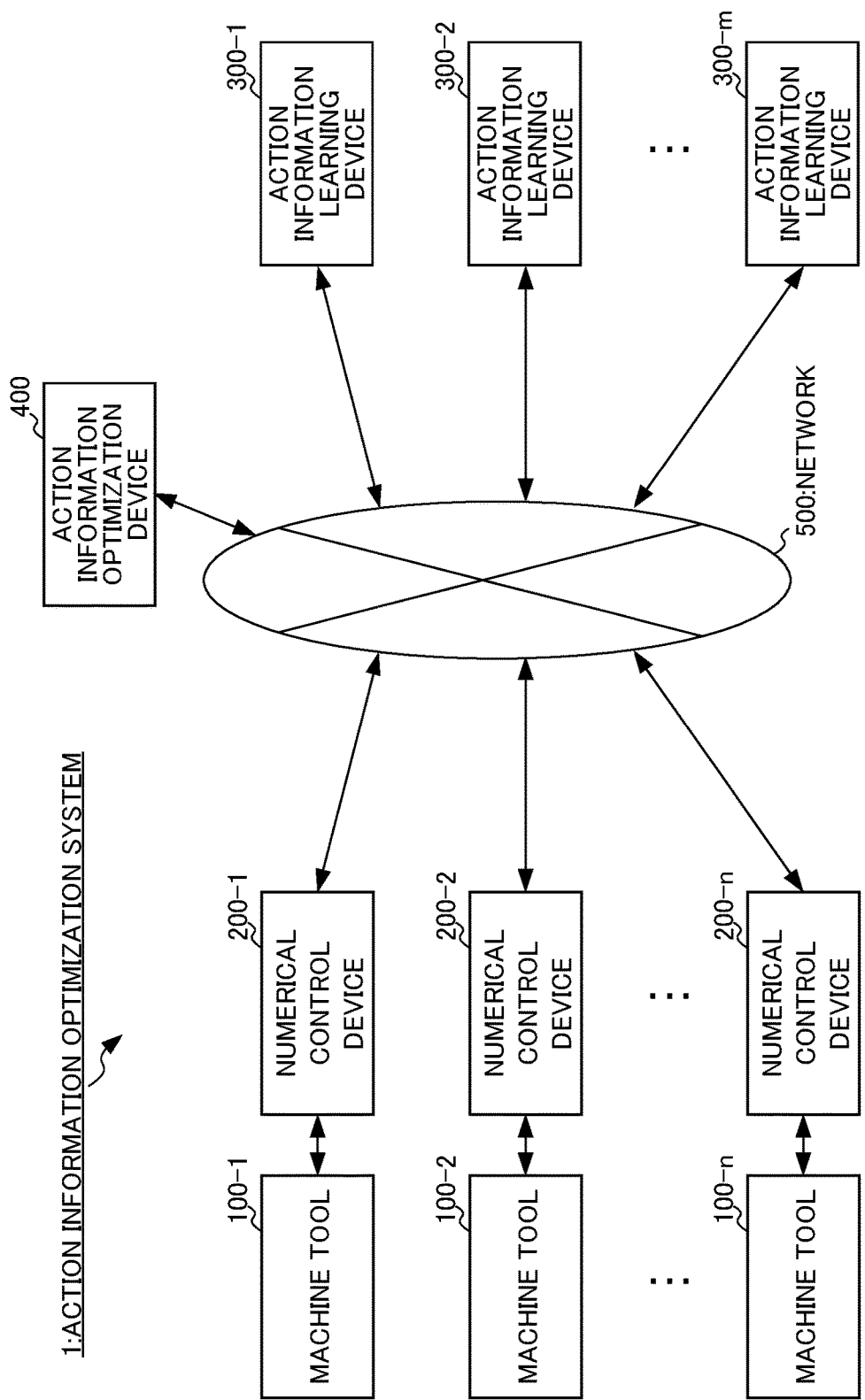
FIG. 1 is a block diagram showing a basic configuration of an overall embodiment of the present invention.

Next, an embodiment of the present invention will be explained in detail by referencing the drawings. First, the configuration of an action information optimization system 1 according to the present embodiment will be explained. The action information optimization system 1 includes n number of machine tools 100, n number of numerical control devices 200, m number of action information learning devices 300, an action information optimization device 400 and a network 500, as shown in FIG. 1. It should be noted that n and m are arbitrary natural numbers.

Herein, the numerical control device 200 and machine tool 100 are established in one-to-one groups, and are connected to be communicable. The numerical control device 200 and machine tool 100 may be connected via a connection interface, and may be connected via a network such as a LAN (Local Area Network). A plurality of groups of this group of the numerical control device 200 and machine tool 100 may be installed in the same factory, or may be installed in respectively different factories, for example.

In addition, the numerical control device 200, action information learning device 300 and action information optimization device 400 are respectively connected directly via a connection interface, or respectively connected via the network 500, to be able to mutually perform communication. It should be noted that the network 500, for example, is a LAN constructed within a factory, Internet, public telephone network, or a combination of these. The specific communication system of the network 500, whether being a wired connection or wireless connection, etc., is not particularly limited.

Figure 2:
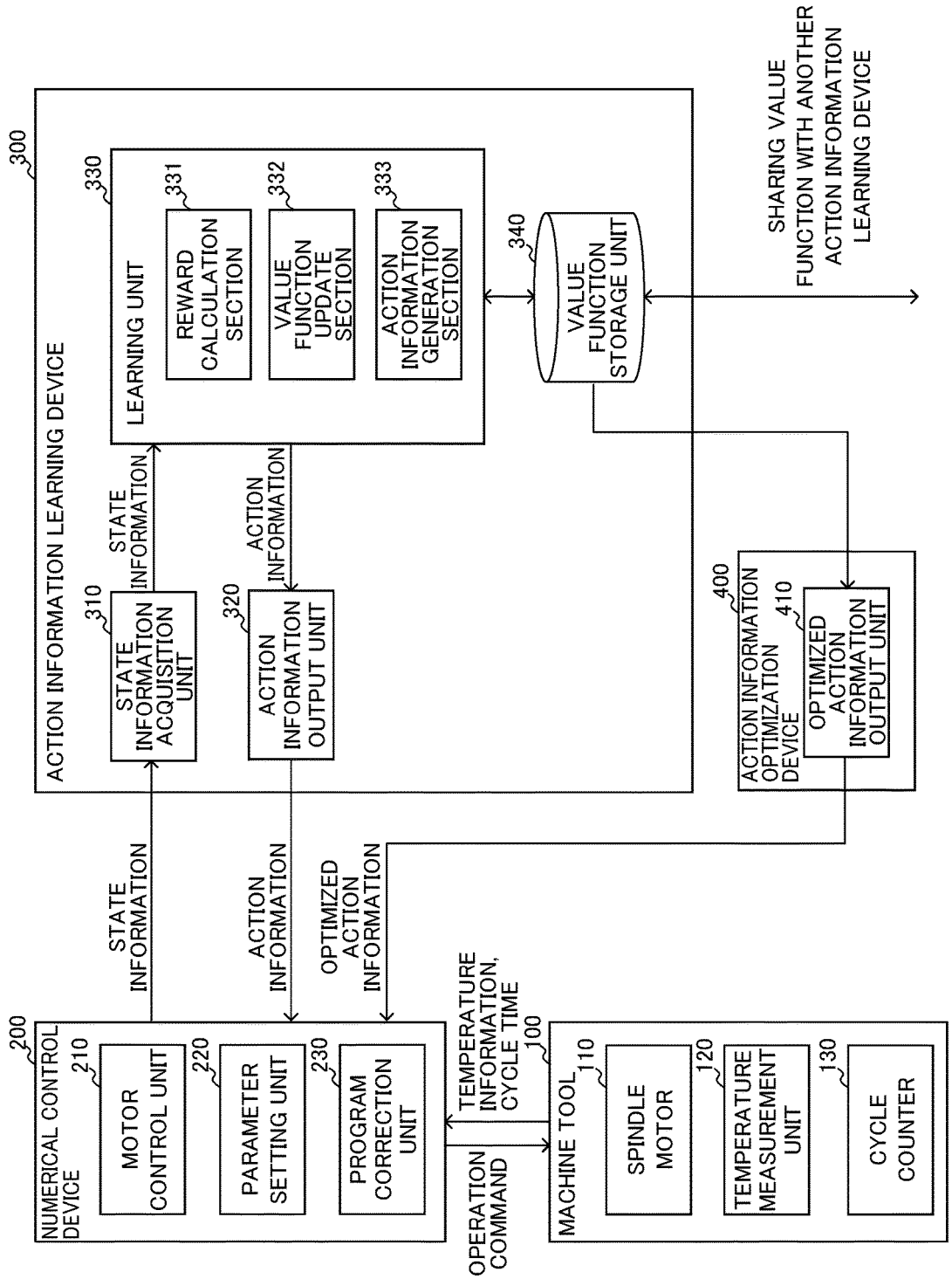
FIG. 2 is a block diagram showing functional blocks possessed by each device included in the embodiment of the present invention.

Next, the functions of these devices included in the action information learning system 1 will be explained by referencing FIG. 2. Herein, FIG. 2 is a block diagram representing the functional blocks included in each device. It should be noted that, since the respective numerical control devices 200 have equivalent functions, only one is illustrated in FIG. 2. Similarly, since each of the machine tools 1 and each of the action information learning devices 300 also have equivalent functions, respectively, only one thereof is illustrated in FIG. 2. In addition, the network 500 existing between each device is omitted from illustration.

The machine tool 100 is a machine tool that performs cutting work, for example, following operation commands that are generated, based on the machining program set in the numerical control device 200 and the setting values of parameters (for example, time constant of acceleration/deceleration, cutting feedrate override value, etc.) set in the numerical control device 200. The machine tool 100 includes a spindle motor 110, temperature measurement unit 120 and cycle counter 130.

The spindle motor 110 is a spindle motor for performing cutting work. A cutting tool (omitted from illustration) for cutting work is installed to the spindle motor 110, and cutting work is performed by the spindle (omitted from illustration) rotating by the spindle motor 110, and a feed shaft (omitted from illustration) which feeds this spindle.

The temperature measurement unit 120 is a temperature sensor that measures the temperature of the spindle motor 110. The temperature measured by the temperature measurement unit 120 is outputted to the numerical control device 200 as temperature information (value indicating spindle temperature or value indicating the rise amount in spindle temperature). It should be noted that the temperature measurement unit 120 may be built into the spindle motor 110, and may be installed in the vicinity of the spindle motor 110.

In the case of the machine tool 100 performing predetermined cutting work, the cycle counter 130 is a counter for counting the cycle time, which is the machining time required in this cutting work. The cycle time counted by the cycle counter 130 is outputted to the numerical control device 200.

The numerical control device 200 is a device causing predetermined cutting work to be performed by the machine tool 100, by controlling the machine tool 100. In addition, the numerical control device 200 sends state information (also referred to as "status") to the action information learning device 300. Furthermore, the numerical control device 200 receives the action information (also referred to as "action") from the action information learning device 300. An explanation will be made for the details of the respective information together with the explanations of functional blocks of the action information learning device 300.

The numerical control device 200 includes a motor control unit 210, parameter setting unit 220, and program correction unit 230.

The motor control unit 210 generates an operation command based on the machining program and setting values of parameters (for example, time constant of acceleration/deceleration, cutting feedrate override value, etc.), and controls the driving of the spindle motor 110, etc. of the machine tool 100, by sending the generated operation command to the machine tool 100. The cutting work is realized by the machine tool 100. Herein, conditions of cutting work (revolution speed of spindle, cutting feedrate, cutting time, dwell causing to standby for designated time in in state as is, etc.) are defined in the machining program.

A parameter setting unit 220 is a portion which sets parameters related to the machining process according to this machining program of the machine tool 100. Parameters of the machine tool 100 are the time constant of acceleration/deceleration, and parameters related to override, for example. The setting values of such parameters are adjusted based on the action information outputted from the action information learning device 300, and optimized action information outputted from the action information optimization device 400.

The program correction unit 230 directly corrects the machining program. More specifically, the program correction unit 230 directly corrects the program code, such as the cutting feedrate, dwell, etc. written in this machining program, based on the action information outputted from the action information learning device 300, and the optimized action information outputted from the action information optimization device 400.

Although the functional blocks of the machine tool 100 and numerical control device 200 have been explained above, the aforementioned functional blocks are portions particularly related to the operations of the present embodiment. The machine tool 100 and numerical control device 200 include common functional blocks in addition to the aforementioned functional blocks. For example, a servomotor for causing the workpiece to move, a control unit for controlling the servomotor, a position/speed detector for performing position/speed feedback control, a motor drive amplifier that amplifies the operation command, a control panel for receiving manipulations of the user, etc. are included as functional blocks. However, since these common functional blocks are well known to those skilled in the art, detailed explanations and illustrations will be omitted.

The action information learning device 300 is a device that performs reinforcement learning. Prior to an explanation of the respective functional blocks included in the action information learning device 300, the basic workings of reinforcement learning will be explained first. An agent (corresponding to the action information learning device 300 of the present embodiment) monitors the state of the environment, selects a certain action, and the environment changes based on this action. In accordance with the change in environment, some kind of reward is given, and the agent learns selection of a better action (decision-making). Supervised learning indicates a completely correct solution; whereas, the reward in reinforcement learning is often a fragmentary value based on a partial change in environment. For this reason, the agent learns so as to select an action such that maximizes the total of reward over the future.

By learning actions with reinforcement learning in this way, it learns a method for learning the appropriate action based on the interaction imparted by the action on the environment, i.e. learning for maximizing the reward obtained in the future. In the present embodiment, this represents the matter of being able to acquire an action such that has an effect on the future, like selecting the action information for shortening the cycle time while also avoiding the occurrence of overheating, for example.

Herein, although it is possible to use any learning method as the reinforcement method, in the following explanation, an explanation is made with an example of a case of using Q-learning, which is a method of learning a quality Q(s,a) of selecting an action a, under a certain state s of the environment. Q learning has the purpose of selecting an action a having the highest quality Q(s,a) from among the available actions a as the optimal action, when a certain state s.

However, at the moment of initially starting Q learning, the correct value of the quality Q(s,a) is completely unknown for combinations of state a and actions a. Therefore, the agent selects various actions a under a certain state s, and learns the correct quality Q(s,a) by making the selection of a better action based on the reward granted relative to the action a at this time.

In addition, since it is desired to maximize the total of rewards obtained in the future, it aims to configure so as to ultimately become $Q(s,a)=E[\Sigma(\gamma^t)r_t]$. Herein, E [ ] represent the expected value, t is the time, γ is a parameter called discount rate described later, $r_t$ is the reward at time t, and Σ is the total according to time t. The expected value in this formula is the expected value in the case of the state changing according to the optimal action. However, since it is unclear what the optimal action is in the course of Q-learning, reinforcement learning is done while searching by performing various actions. An update method of such a quality Q(s,a) can be represented by the following Formula (1), for example.

[Formula (1)]

$$Q(s_{t+1}, a_{t+1}) \leftarrow Q(s_t, a_t) + \alpha\left(r_{t+1} + \gamma \max_a Q(s_{t+1}, a) - Q(s_t, a_t)\right). \quad (1)$$

In the above Formula (1), $s_t$ represents the state of the environment at time t, and $a_t$ represents the action at time t. The state changes to $s_{t+1}$ according to action $a_t$. $r_{t+1}$ represents the reward obtained by this change in state. In addition, a term with max becomes a value arrived at by multiplying γ by the Q value in the case of selecting the action a having the highest Q value known at this time under the state $s_{t+1}$. Herein, γ is a parameter of 0<γ≤1, and is called discount rate. In addition, α is a learning rate, and defined in the range of 0<α≤1.

The aforementioned Formula (1) expresses a method of updating the quality $Q(s_t,a_t)$ of a action at in the state $s_t$, based on the returned reward $r_{t+1}$ as a result of a trial run $a_t$. This update type shows the matter of $Q(s_t,a_t)$ increasing if the value $\max_a Q(s_{t+1},a)$ of the best action in the subsequent state $s_t$+1 from action at is greater than the quality $Q(s_t,a_t)$ of the action in state $s_t$, and shows the $Q(s_t,a_t)$ decreasing if conversely smaller. In other words, the quality Q of a certain action in a certain state is made to approach the value of the best action in the subsequent state depending on this. However, this difference changes depending on the ideal states for the discount rate γ and reward $r_{t+1}$; however, basically, it becomes a mechanisms in which the quality for the best action in a certain state propagates to the quality of the action one previous state leading to this.

Herein, with Q-learning, there is a method of performing learning by creating a table of Q(s,a) for all state action pairs (s,a). However, there are cases where the number of state is too great to obtain the values of Q(s,a) for all state action pairs, and Q-learning converges but requires much time.

Therefore, it may be configured to use the known technology called DQN (Deep Q-Network). More specifically, by constituting a value function Q using an appropriate neural network, and adjusting parameters of the neural network, it may be configured so as to calculate the value of the quality Q(s,a) by approximating the value function Q by the appropriate neural network. By using DQN, it becomes possible to shorten the time required in order for Q-learning to converge. It should be noted that there is a detailed description of DQN in the following Non-Patent Document.

Non-Patent Document

"Human-level control through deep reinforcement learning," Volodymyr Mnih (online), Nature, 518.7540 (2015), 529 (searched Jan. 17, 2017 (year/month/day))

The action information learning device 300 performs the Q learning explained above. More specifically, the action information learning device 300 learns the quality Q selected by setting the combination of contents of the machining program set in the machine tool 100 and the parameters at the time of execution of this machining program, etc. as state s, and setting the correction of his machining program and adjustment of parameters related to this state s as action a.

The action information learning device 300 monitors the state s such as the machining program, parameters, etc. set in the machine tool 100, and determines the action a. The action information learning device 300 is returned a reward every time doing an action a. The action information learning device 300 searches for the optimal action a in a trial and error manner so that the total of rewards in the future becomes a maximum. By configuring in this way, the action information learning device 300 makes it possible to select the optimal action a relative to a state s, which is contents of the machining program, a combination of parameters during execution of this machining program, etc. set in the machine tool.

In other words, based on the value function Q learned by the action information learning device 300, by selecting the action a such that the value of Q becomes the maximum, among the actions a applied to the combination of machining program and parameters related to a certain state s, it becomes possible to select an action a such that this machining cycle time becomes the shortest while also avoiding the occurrence of overheating.

In order to perform the above reinforcement learning, the action information learning device 300 includes a state information acquisition unit 310, action information output unit 320, learning unit 330 and value function storage unit 340.

The state information acquisition unit 310 is a portion that acquires state information s, which is the contents of a machining program, combination of parameters during execution of this machining program, etc., from the numerical control device 200 (and/or machine tool 100). This state information s corresponds to the environment state s in Q-learning.

More specifically, the combination of contents of the machining program for controlling the machine tool 100 and parameters during execution of this machining program, spindle temperature of the machine tool 100 prior to executing the machining process according to this machining program, etc., and cycle time in the case of executing the machining process according to this machining program, etc. are included in the state information s of the present embodiment. The state information acquisition unit 310 outputs the acquired state information s to the learning unit 330.

In addition, the state information acquisition unit 310 also acquires judgment information for calculating the reward for performing Q-learning. More specifically, for the machining program related to state information s and combination of parameters during execution of this machining program, the spindle temperature of the machine tool 100 after execution and cycle time in the case of executing this machining process are defined as the judgment information for calculating the reward for performing Q-learning.

The action information output unit 320 is a portion that sends the action information a inputted from the learning unit 330 to the numerical control device 200. As mentioned above, the numerical control device 200 transitions to the next state s (i.e. state including corrected machining program, corrected parameters, spindle temperature of machine tool 100, cycle time in case of executing machining process according to this corrected machining program and corrected parameters) by correcting the current state s, i.e. the machining program and parameters currently set, based on this action information.

The learning unit 330 is a portion that learns the quality Q(s,a) in the case of selecting a certain action a under a certain environmental state s. More specifically, the learning unit 330 includes a reward calculation section 331, value function update section 332 and action information generation section 333.

The reward calculation section 331 is a portion that calculates the reward for a case selecting an action a under a certain state s based on the judgment information. Herein, in the present embodiment, the value of reward shall be a negative value in the case of the machine tool 100 operating based on the corrected machining program related to the state information s' corrected according to the action information a and the corrected parameter values during execution of this corrected machining program overheating.

In addition, the value of reward shall be a negative value in the case of the cycle time of the machine tool 100 operating based on the corrected machining program related to the state information s' corrected according to the action information a and the corrected parameter values during execution of this corrected machining program becoming longer than the cycle time of the machine tool 100 operated based on the machining program prior to correction related to the state information s prior to being corrected according to the action information a and the parameter values prior to correction during execution of this machining program prior to correction.

On the other hand, the value of reward shall be a positive value in the case of the machine tool 100 operating based on the corrected machining program related to the state information s' corrected according to the action information a and the corrected parameter values during execution of this corrected machining program not overheating, and the cycle time becoming shorter than the cycle time of the machine tool 100 operated based on the machining program prior to correction related to the state information s prior to being corrected according to the action information a and the parameter values prior to correction during execution of this machining program prior to correction.

In addition, if configuring so as to give weighting for the value of reward, for example, since overheating is a state that is not preferred, it is preferable to make the magnitude of the negative value in the case of overheating to be large compared to the negative value in the case of the cycle time becoming longer. In addition, it may be configured to make the negative value larger according to a proportion, as the negative value in the case of the cycle time at state s' after executing action a becoming longer than the cycle time in the previous state s. In other words, it is good to configure so that the negative value becomes larger according to the extent to which the cycle time lengthened. Conversely, it may be configured so as to increase the positive value according to a proportion, as the positive value in the case of the cycle time at state s' after executing action a becoming shorter than the cycle time in the previous state s. In other words, it is good to configure so that the positive value becomes larger according to the extent to which the cycle time shortened.

The value function update section 332 updates the value function Q stored by the value function storage section 340, by performing Q-learning based on the state s, action a, state s' in case of applying action a to state s, and value of reward calculated in the above-mentioned way. The update of the value function Q may be performed by on-line learning, may be performed by batch learning, or may be performed by mini-batch learning. On-line learning is a learning method of performing updating of the value function Q instantaneously, whenever the state s transitions to a new state s', by applying a certain action a to the current state s. In addition, batch learning is a learning method of collecting data for learning by repeating the applying of a certain action a to the current state s, and the state s transitioning to a new state s', and then performing updating of the value function Q using all of the collected data for learning. Furthermore, mini-batch learning is a learning method between on-line learning and batch learning of performing updating of the value function Q each time a certain amount of data for learning accumulates.

The action information generation section 333 generates action information a in order to perform various operations (corresponding to action a in Q-learning) in the machine tool 100 over the course of Q-learning, and outputs the generated action information a to the action information output unit 320.

More specifically, the action information generation section 333 selects actions a for the course of Q-learning with respect to the current state s. Correction information of the cutting feedrate, dwell, etc. written by the machining program related to the current state s, and setting values of parameters (for example, time constant of acceleration/deceleration, cutting feedrate override value, etc.) related to the current state s are included in the action information a of the present embodiment.

For example, in the case of applying correction information of the cutting feedrate, dwell, etc. and setting values of parameters (for example, time constant of acceleration/deceleration, cutting feedrate override value, etc.), which are included in the action a with respect to the machining program and parameters included in the state s, then transitioning to the state s', and a plus reward (reward of positive value) being returned, the action information generation section 333 may configure so as to adopt a plan that selects, as the next action a', an action a' such that the time cycle further shortens, such as incrementally increasing the cutting feedrate, or incrementally decreasing the time constant, for example.

In addition, it may conversely be configured so as to adopt a plan that selects, as the next action a', an action a' such that the load further decreases such as incrementally decreasing the cutting feedrate or incrementally increasing the time constant, for example, in the case of a minus reward (reward of negative value) being returned.

In addition, the action information generation section 333 may configure so as to adopt a plan that selects the action a' by a well-known method such as a greedy method of selecting the action a' having the highest quality Q(s,a) among the qualities of existing actions a estimated, or an ε-greedy method of randomly selecting the action a' with a small probability ε, and selecting the action a' having the highest quality Q(s,a) other than this.

The value function storage unit 340 is a storage device that stores the value functions Q. The value functions Q stored in the value function storage unit 340 are updated by the value function update section 332. In addition, it may be configured so that the value functions Q stored in the value function storage unit 340 are shared with another action information learning device 300. If configured so as to share the value functions Q with a plurality of action information learning devices 300, since it becomes possible to perform reinforcement learning by distributing to the respective action information learning devices 300, it becomes possible to improve the efficiency of reinforcement learning.

The action information optimization device 400 is a device that generates action information a (hereinafter referred to as "optimized action information") for causing an operation for which the quality Q(s,a) reaches a maximum to be performed in the machine tool 100, based on the value function Q updated by the value function update section 332 performing Q-learning.

The action information optimization device 400 includes an optimized action information output unit 410. The optimized action information output unit 410 acquires the value function Q stored by the value function storage unit 340. This value function Q is a function updated by the value function update section 332 performing Q-learning as mentioned above. Then, the optimized action information output unit 410 generates the optimized action information based on the value function Q, and outputs the optimized action information thus generated to the numerical control device 200. In this optimized action information, the corrected machining program and corrected parameters values during execution of this corrected machining program are included, similarly to the action information outputted by the action information output unit 320 in the course of Q-learning.

By the numerical control device 200 correcting the machining program and parameters currently set based on this optimized action information and generating an operation command, the machine tool 100 can operate so that this machining cycle time becomes the shortest while also avoiding the occurrence of overheating.

The functional blocks included in the numerical control device 200, action information learning device 300, and action information optimization device 400 have been explained above.

In order to realize these functional blocks, each of the numerical control device 200, action information learning device 300, and action information optimization device 400 includes an arithmetic processing unit such as a CPU (Central Processing Unit). In addition, each of the numerical control device 200, action information learning device 300, and action information optimization device 400 also includes an auxiliary storage device such as a HDD (Hard Disk Drive) storing various control programs such as application software and the OS (Operating System), and a main storage device such as RAM (Random Access Memory) for storing data that is necessitated temporarily upon the arithmetic processing unit executing programs.

Then, in each of the numerical control device 200, action information learning device 300, and action information optimization device 400, the arithmetic processing unit reads out the application software and/or OS from the auxiliary storage device, and performs arithmetic processing based on this application software and/or OS, while expanding the read application software and/or OS in the main storage device. In addition, based on these computation results, the various hardware possessed by the respective devices are controlled. The functional blocks of the present embodiment are thereby realized. In other words, the present embodiment can be realized by hardware and software cooperating.

As a specific example, the numerical control device 200 can be realized by combining application software for realizing the present embodiment with a common numerical control device. In addition, the action information learning device 300 and/or action information optimization device 400 can be realized by combining application software for realizing the present embodiment with a general personal computer.

However, since the computation amount increases accompanying machine learning for the action information learning device 300, it is good to make so that high-speed processing is possible when configuring to install GPUs (Graphics Processing Units) to a personal computer, and using the GPUs in the arithmetic processing accompanying machine learning, according to a technique called GPGPU (General-Purpose computing on Graphics Processing Units). Furthermore, in order to perform higher-speed processing, it may be configured to construct a computer cluster using a plurality of computers equipped with such GPUs, and perform parallel processing with the plurality of computers included in this computer cluster.

Next, an explanation will be made for operation of the action information learning device 300 during Q-learning in the present embodiment by referencing the flowchart of FIG. 3.

First, in Step S11, the state information acquisition section 310 acquires state information from the numerical control device 200. The acquired state information is outputted to the value function update section 332 and/or action information generation section 333. As mentioned above, this state information is information corresponding to a state s in Q-learning, and the contents of the machining program and setting values of parameters, spindle temperature of the machine tool 100, and cycle time in the case of machining processing based on this machining program and parameters at the moment of Step S11 are included therein. It should be noted that the machining program and setting values of parameters at the moment of starting Q-learning initially are configured so as to be generated by a user in advance. In other words, in the present embodiment, the machining program and initial setting values of parameters generated by the user are adjusted to optimal by way of reinforcement learning.

In Step S12, the action information generation section 333 generates new action information, and outputs the new action information thus generated to the numerical control device 200 via the action information output unit 320. The numerical control device 200 having received the action information drives the machine tool 100 to perform cutting work according to the state s' made by correcting the machining program and parameters related to the current state s, based on the received action information. As mentioned above, this action information corresponds to the action a in Q-learning. Herein, the point of the action information including the corrected values of a machining program defining the cutting feedrate, time of dwell, etc., and the setting values of parameters including the time constant of acceleration/deceleration is as mentioned above.

In Step S13, the state information acquisition section 310 acquires judgment information for the new state s'. Herein, the machining program and parameters related to state s', temperature information of the spindle, and cycle time required in order to perform the machining process related to state s' are included in the new state s'. In addition, the judgment information includes temperature information which changed by performing the machining process related to state s', and the cycle time required in order to perform the machining process related to state s'. The acquired judgment information is outputted to the value function update section 332.

The value function update section 332 calculates the reward based on the inputted judgment information. For this reason, in Step S14, the value function update section 332 judges whether or not the drive unit of the machine tool 100 overheated by executing the machining program and parameters related to state s', based on the temperature information included in the judgment information.

Herein, if overheating (YES in Step S14), the reward is set to a first value in Step S15. Herein, the first value shall be a negative value. On the other hand, if not overheating (NO in Step S14), the processing advances to Step S16.

In Step S16, it is judged whether or not the cycle time became shorter based on the cycle time included in the judgment information. Such a judgment can be performed by comparing the cycle time required in order perform the machining process related to state s' included in the judgment information of state s', and the cycle time required in order to perform the machining process related to state s, included in the judgment information of state s, which is the state prior to state s'.

Herein, if the cycle time becomes shorter (YES in Step S16), the reward is set to a second value in Step S17. Herein, the second value shall be a positive value. On the other hand, if the cycle time does not become shorter (NO in Step S16), the reward is set to a third value in Step S18. Herein, the third value shall be a negative value. It should be noted that it may be configured so as to perform weighting for the first value, second value and third value, as mentioned above.

When any of Step S15, Step S17 and Step S18 ends, the value function update section 332 updates the value function Q stored by the value function storage unit 340, based on the value of reward calculated in any of these steps. Then, returning back to Step S11 again, the value function Q converges to an appropriate value by repeating the aforementioned processing. It should be noted that it may be configured so as to end the processing on the event of the aforementioned processing being repeated a predetermined number of times, or being repeated for a predetermined time. It should be noted that, although Step S15 exemplifies on-line updating, it may be substituted by batch update or mini-batch update instead of on-line updating.

According to the operations explained above by referencing FIG. 3, the present embodiment exerts an effect in being able to generate a value function Q for generating action information for shortening the cycle time while also avoiding the occurrence of overheating.

Next, an explanation will be made for operations during the generation of optimized action information by the action information optimization device 400, by referencing the flowchart of FIG. 4. First, in Step S21, the optimized action information output unit 410 of the action information optimization device 400 acquires the value function Q stored by the value function storage unit 340. This value function Q is a function updated by the value function update section 332 performing Q-learning as mentioned above.

In Step S22, the optimized action information output section 410 generates optimized action information based on this value function Q, and outputs the optimized action information thus generated to the numerical control device 200.

By the numerical control device 200 correcting the machining program and parameters currently set based on this optimized action information, and generating an operation command, the machine tool 100 exerts an effect in being able to operate so that this machining cycle time becomes the shortest, while also avoiding the occurrence of overheating.

In addition, according to the operations explained by referencing FIG. 4, the present embodiment exerts an effect in making possible to control the machine tool 100 by shortening the cycle time while also avoiding the occurrence of overheating, by way of generating optimized action information based on the value function Q, correcting the machining program and parameters currently set based on this optimized action information, and generating an operation command.

This effect of the present embodiment will be explained in further detail. As a premise, it is possible to shorten the cycle time by adjusting the machining program to raise the cutting feedrate. On the other hand, it is possible to suppress the heat generation of the spindle by lowering the cutting feedrate. In addition, it is possible to shorten the cycle time by adjusting the machining program to shorten the dwell. On the other hand, it is possible to suppress heat generation of the spindle by lengthening the dwell. Furthermore, it is possible to shorten the cycle time by adjusting the setting values of parameters to shorten the time constant of acceleration/deceleration. On the other hand, it is possible to suppress heat generation of the spindle by lengthening the time constant of acceleration/deceleration.

The reduction in cycle time and heat generation of the spindle is often in a trade-off relationship in this way. For this reason, it is difficult to shorten the cycle time while also avoiding the occurrence of overheating by appropriately adjusting the machining program and setting values of parameters. Therefore, with the general technology, in the case of overheating occurring, the drive unit is stopped in a makeshift manner, or the speed of the drive unit is made to decline.

In contrast, the present embodiment can shorten the cycle time while also avoiding the occurrence of overheating, by performing reinforcement learning while adjusting the machining program and setting values of parameters as mentioned above. In other words, the present embodiment exerts an advantageous effect compared to the general technology.

It should be noted that each of the respective devices included in the above-mentioned action information learning system can be realized by hardware, software, or a combination of these. In addition, the action information learning method performed by cooperation of each of the respective devices included in the above-mentioned action information learning system can also be realized by hardware, software, or a combination of these. Herein, being realized by software indicates the matter of being realized by a computer reading out and executing programs.

The programs can be stored using various types of non-transitory computer readable media, and supplied to a computer. The non-transitory computer readable media includes tangible storage media. Examples of non-transitory computer readable media include magnetic media (for example, flexible disks, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)). In addition, the programs may be supplied to a computer by way of various types of transitory computer readable media. Examples of transitory computer readable media include electrical signals, optical signals and electromagnetic waves. The transitory computer readable media can supply programs to a computer via wired communication paths such as electrical wires and optical fiber, or a wireless communication path.

In addition, the aforementioned embodiment is a preferred embodiment of the present invention; however, it is not to limit the scope of the present invention to only the above-mentioned embodiment, and implementation is possible in modes achieved by conducting various modifications in a scope not departing from the gist of the present invention.

The aforementioned embodiment gives an example of a machine tool that performs cutting work as the machine tool 100; however, it is not limited thereto. For example, a machine tool that performs other machining such as grinding, polishing, rolling or forging may be established as the machine tool 100.

The aforementioned embodiment assumes that the action information learning device 300 and action information optimization device 400 are realized by devices separate from the machine tool 100 and numerical control device 200; however, it may be configured so as to realize part or the entirety of the functions of the action information learning device 300 and/or action information optimization device 400 by the machine tool 100 and/or numerical control device 200. In addition, it may be configured so as to realize both the functions of the action information learning device 300 and action information optimization device 400 by a singular device.

EXPLANATION OF REFERENCE NUMERALS 100 machine tool
110 spindle motor
120 temperature measurement unit
130 cycle counter
200 numerical control device
210 motor control unit
220 parameter setting unit
300 action information learning device
310 state information acquisition unit
320 action information output unit
330 learning unit
331 reward calculation section
332 value function update section
333 action information generation section
340 value function storage unit
400 action information optimization device
500 network

What is claimed is:

1. An action information learning device, comprising:
a processor; and
a memory,
wherein the processor is configured to:
acquire state information including an operation pattern of a spindle and a combination of parameters related to machining of a machine tool, wherein the combination of the parameters related to the machining of the machine tool is a combination of an operation pattern including at least any of a cutting feedrate and a dwell causing the spindle to standby for a designated time, and a parameter including at least any of a time constant of acceleration/deceleration and a cutting feedrate override;
output action information including adjustment information for the operation pattern and the combination of parameters included in the state information;
acquire judgment information, which is information for temperature of the machine tool and a machining time related to the machining of the machine tool, and calculate a value of a reward for reinforcement learning based on the judgment information thus acquired;
update a value function by performing the reinforcement learning based on the value of the reward, the state information and the action information,
set the value of the reward as a first negative value in a case of the temperature of the machine tool being at least a predetermined temperature,
set the value of the reward as a positive value in a case of the temperature of the machine tool being less than a predetermined temperature, and a machining time of the machine tool being shorter than a prior machining time, and
set the value of the reward as a second negative value in a case of the temperature of the machine tool being less than a predetermined temperature, and a machining time of the machine tool being longer than a prior machining time.

2. The action information learning device according to claim 1, wherein the value function is shared with another action information learning device, and
wherein the processor updates the value function that was shared.

3. An action information optimization system comprising:
the action information learning device according to claim 1; and an action information optimization device,
wherein the action information optimization device generates optimized action information, which is action information for maximizing a quality of the machining by the machine tool, based on a value function updated by the processor, and outputs the optimized action information thus generated in order to cause the machining to be performed in the machine tool.

4. The action information learning device according to claim 1, wherein the processor sets a magnitude of the first negative value to be larger than a magnitude of the second negative value.

5. The action information learning device according to claim 1, wherein the processor:
increases the positive value according to an extent by which a machining time of the machine tool became shorter than a previous machining time, and
increases the second negative value according to an extent by which the machining time of the machine tool became longer than a previous machining time.

6. A non-transitory computer-readable storage medium storing one or more programs for action information learning, the one or more programs for execution by one or more processors of a computer system, the one or more programs comprising instructions to:
acquire state information including an operation pattern of a spindle and a combination of parameters related to machining of a machine tool, wherein the combination of the parameters related to the machining of the machine tool is a combination of an operation pattern including at least any of a cutting feedrate and a dwell causing the spindle to standby for a designated time, and a parameter including at least any of a time constant of acceleration/deceleration and a cutting feedrate override;
output action information including adjustment information for the operation pattern and the combination of parameters included in the state information;
acquire judgment information, which is information for temperature of the machine tool and a machining time related to the machining of the machine tool, and calculate a value of a reward for reinforcement learning based on the judgment information thus acquired;
update a value function by performing the reinforcement learning based on the value of the reward, the state information and the action information,
set the value of the reward as a first negative value in a case of the temperature of the machine tool being at least a predetermined temperature,
set the value of the reward as a positive value in a case of the temperature of the machine tool being less than a predetermined temperature, and a machining time of the machine tool being shorter than a prior machining time, and
set the value of the reward as a second negative value in a case of the temperature of the machine tool being less than a predetermined temperature, and a machining time of the machine tool being longer than a prior machining time.

* * * * *